(12) United States Patent
Grebenisan

(10) Patent No.: US 6,506,996 B2
(45) Date of Patent: Jan. 14, 2003

(54) SYSTEM AND METHOD FOR PERFORMING PREVENTATIVE MAINTENANCE UPON SPOT WELDING GUNS

(75) Inventor: Dan Grebenisan, Oshawa (CA)

(73) Assignee: General Motors Corporation, Detroit, MI (US)

( * ) Notice: Subject to any disclaimer, the term of this patent is extended or adjusted under 35 U.S.C. 154(b) by 46 days.

(21) Appl. No.: 09/853,022

(22) Filed: May 11, 2001

(65) Prior Publication Data

US 2002/0166842 A1 Nov. 14, 2002

(51) Int. Cl.[7] ............................................. B23K 11/25
(52) U.S. Cl. ..................... 219/86.41; 219/109
(58) Field of Search ................. 219/109, 110, 219/117.1, 86.41

(56) References Cited

U.S. PATENT DOCUMENTS

| | | | | |
|---|---|---|---|---|
| 3,546,421 A | * | 12/1970 | Meyer et al. | 219/110 |
| 4,596,917 A | | 6/1986 | Nied et al. | 219/109 |
| 4,634,829 A | * | 1/1987 | Okabe et al. | 219/110 |
| 5,493,093 A | | 2/1996 | Cecil | 219/110 |

* cited by examiner

*Primary Examiner*—Clifford C. Shaw
(74) *Attorney, Agent, or Firm*—Jeffrey A. Sedlar

(57) ABSTRACT

A system and method for performing preventative maintenance upon spot welding guns in an automotive vehicle assembly plant is disclosed. The system includes a data collection system, a data analysis system and a database. The system has the ability to monitor parameters of welding guns to predict when a failure of one or more of the guns is likely to occur so that maintenance can be performed on the guns according to the method.

16 Claims, 1 Drawing Sheet

SYSTEM AND METHOD FOR PERFORMING PREVENTATIVE MAINTENANCE UPON SPOT WELDING GUNS

TECHNICAL FIELD

The present invention relates to a system and method for performing preventative maintenance upon spot welding guns used in automotive vehicle assembly plants.

BACKGROUND OF THE INVENTION

The assembly and manufacture of automotive vehicles often requires multiple spot welds. Over time, the repetitive use of spot welding guns tends to wear and even cause failure of such guns, thereby slowing vehicle manufacture and/or causing downtime for automotive vehicle assembly. It is known to employ preventive maintenance programs such as testing or replacement of spot welding guns or components thereof at predetermined time intervals to avoid excessive wear or failure. However, such programs may cause waste by prematurely replacing guns or by allowing downtime if the guns fails prior to the predetermined time intervals established by the program.

In view of the foregoing, it should be appreciated that it would be desirable to provide a method and system that more accurately determines when preventative maintenance should be performed on spot welding guns. Furthermore, additional desirable features will become apparent to one of ordinary skill in the art from the foregoing background of invention and following detailed description of a preferred exemplary embodiment and appended claims.

SUMMARY OF THE INVENTION

The present invention provides a method and system for performing preventative maintenance on one or more spot welding guns.

According to the method, a plurality of C-factors is collected during a depreciation cycle of a spot welding gun. A plurality of C-factor averages ($C_a$) is computed for the plurality of C-factors, wherein at least one of the plurality of C-factor averages ($C_a$) is computed for each of a plurality of predetermined time intervals within the depreciation cycle. A lower limit is established for the plurality of C-factor averages ($C_a$). A plurality of rates of depreciation ($R_d$) are computed using the plurality of C-factor averages ($C_a$). A threshold value is established for the plurality of rates of depreciation ($R_d$). Preventative maintenance is performed on the spot welding gun if a comparison between at least one of the plurality of rates of depreciation ($R_d$) and the threshold value for the rates of depreciation ($R_d$) indicates an upcoming failure of the welding gun or if a comparison between at least one of the plurality of C-factor averages ($C_a$) and the lower limit for the plurality of C-factor averages ($C_a$) indicates the upcoming failure of the welding gun.

The system is comprised of a weld controller configured to calculate a plurality of C-factors during a depreciation cycle of a spot welding gun. A data collection system is configured to collect the plurality of C-factors calculated by the weld controller during the depreciation cycle of the spot welding gun. A data analysis system is configured to access the data collection system and compute a plurality of C-factor averages ($C_a$) of the plurality of C-factors with at least one of the plurality of C-factor averages ($C_a$) computed for each of a plurality of predetermined time intervals within the depreciation cycle such that preventative maintenance can be performed if a comparison between at least one of the plurality of C-factor averages ($C_a$) and a lower limit for the plurality C-factor averages ($C_a$) indicates an upcoming failure of the welding gun. The data analysis system is further configured to compute a plurality of rates of depreciation ($R_d$) of the plurality of C-factor averages ($C_a$) such that preventative maintenance can also be performed if a comparison between at least one of the plurality of rates of depreciation ($R_d$) and a threshold value for the plurality of rates of depreciation ($R_d$) indicates the upcoming failure of the welding gun.

BRIEF DESCRIPTION OF THE DRAWINGS

These and other aspects and advantages of the present invention will become apparent upon reading the following detailed description in combination with the accompanying drawings, in which.

DETAILED DESCRIPTION OF THE PREFERRED EMBODIMENT

Figure 1:
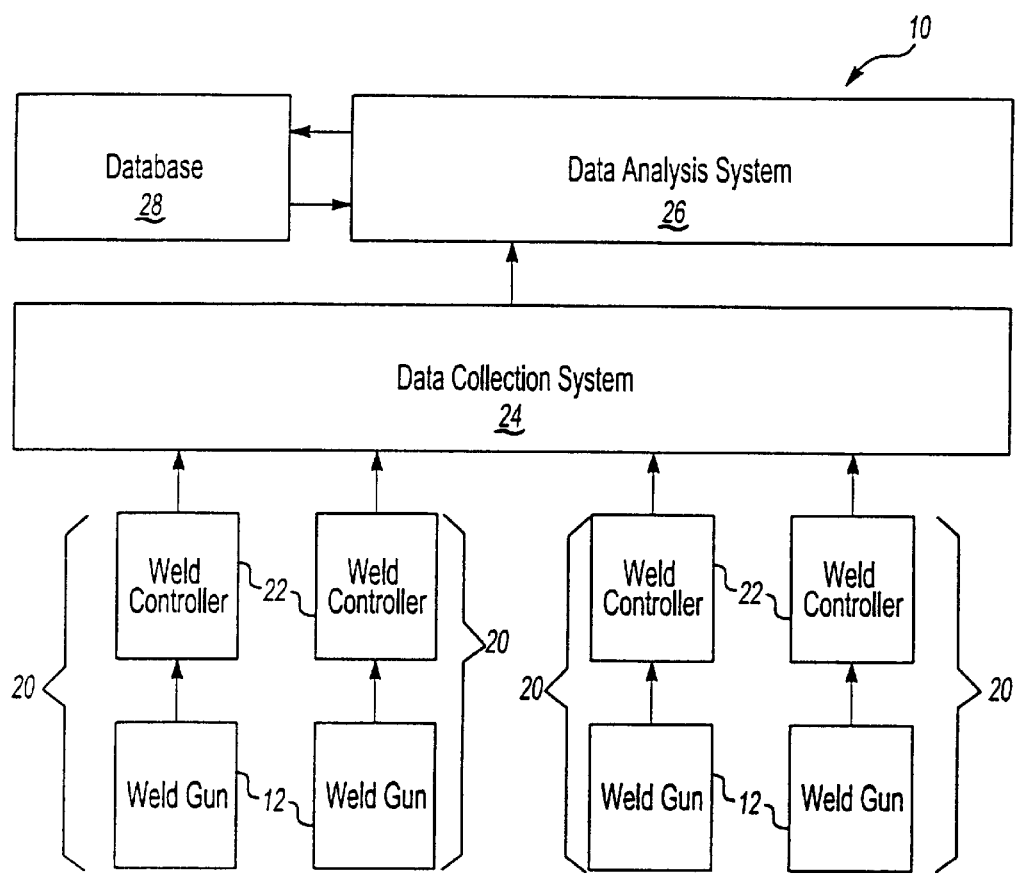
FIG. 1 illustrates a system for performing preventative maintenance upon spot welding guns.

Referring to FIG. 1, there is illustrated a maintenance system 10 for performing preventative maintenance upon one or more spot welding guns 12 in an automotive vehicle assembly plant. The maintenance system 10 can be configured to monitor one or more parameters of the guns 12 to predict when a failure of one or more of the guns 12 is likely to occur so that maintenance can be performed prior to failure. Failure, as defined herein, can mean any lack of ability of a spot welding gun 12 to adequately perform as needed or desired and a spot welding gun 12 can mean any number of welding gun configurations including robotic weld guns, fixed weld guns, manual weld guns and the like.

Each of the spot welding guns 12 is preferably a component of a spot welding station 20 that also includes a weld controller 22. The weld controller 22 provides any number of operational commands to at least one welding gun 12 and possibly multiple welding guns 12. For example, the weld controller 22 can be configured to provide operational commands for the magnitude of current delivery, the duration of current delivery and the like.

Each of the welding guns 12 operates in depreciation cycles wherein a depreciation cycle is generally defined as the time that elapses between performance of maintenance upon the welding gun 12 or the time that elapses between the installation of a new welding gun 12 and the performance of maintenance upon that gun 12. Examples of such maintenance replacements or repairs include replacing or repairing weld cables, shunts, shanks, and the like or replacing the entire gun 12. The skilled artisan will recognize that each depreciation cycle may begin after the performance of any maintenance replacement or repair or after certain types of maintenance replacements or repairs (e.g., major repairs or replacements).

During each depreciation cycle, the weld controllers 22 preferably calculate a C-factor of each gun 12 as the gun 12 forms welds. The C-factor generally indicates how much resistance the welding gun 12 is exhibiting against current flowing through the circuitry of the gun 12. A smaller C-factor generally indicates a greater resistance of the gun 12 to carrying the current necessary for the gun 12 to operate properly and, therefore, can assist in determining when maintenance of the gun 12 is desired.

The weld gun controllers 22 can be configured to calculate one or more C-factors for each weld formed by the weld gun 12 or for intermittent or selective welds formed by the gun 12. As an example, the weld controller 22 may calculate a C-factor by measuring the current ($I_d$) delivered by a weld gun 12 (e.g., the secondary current delivered) with sensors or the like and dividing the current ($I_d$) by the percentage of maximum secondary current ($\%I_{max}$), wherein the percentage of maximum secondary current ($\%I_{max}$) may be inversely proportional to percentages of firing angle(s) of one or more semiconductor devices (e.g., thyristors, semiconductor or silicon controlled rectifiers (SCRs) or the like).

The calculated C-factors are subsequently transmitted by one or more of the weld controllers 22 to a weld data collection system 24 of the maintenance system 10. Preferably, the weld data collection system 24 is a computer based memory and processor system that is in operable communication with one or more of the weld controllers 22 via wires, busses or otherwise and includes operational instructions for communicating with the weld controllers 22. The data collection system 24 is configured to collect data related to one or more welding stations 20, including the C-factors of the weld guns 12. Preferably, the weld data collection system 24 has the memory capability to store several days of data transmitted from the weld controllers 22.

The C-factor values are transmitted within the maintenance system 10 from the weld data collection system 24 to the data analysis system 26. The data analysis system 26 is also preferably a computer based memory and processor system that is in operable communication with the data collection system 26 and includes operational instructions for analyzing and manipulating data. In the data analysis system 26, averages ($C_a$) of C-factors for each of the guns 12 are calculated for predetermined time intervals. Advantageously, the C-factor averages ($C_a$) filter out any short peaks or drops of the C-factor that do not accurately reflect the status of the circuitry of the weld gun 12. Preferably, the predetermined time intervals are greater than about twelve hours and are more preferably about twenty-four hours (e.g., a predetermined interval that extends for one or more shifts of operation of an automotive assembly plant or assembly line).

As the averages ($C_a$) are calculated, stepping of the weld tips (not shown) for the weld guns 12 can take place. During spot welding, weld tips wear and can require greater current to be delivered to the tips to form consistent welds. Consequently, the current delivered to the weld tips is stepped up according to known cycles of weld tip wear (i.e., stepping cycles) until the tip is replaced and a new stepping cycle is started. The C-factors that are recorded to calculate the C-factor averages ($C_a$) may be taken with disregard to such stepping, over several stepping cycles or may be taken during predetermined time intervals during such stepping cycles. Preferably, the C-factors for the averages ($C_a$) are taken for a predetermined portion of time or predetermined number of welds starting at the beginning of the stepping cycles. At the beginning of stepping cycle, the weld tip is at its least worn condition such that C-factors more accurately represent the condition or resistance of the weld gun circuitry rather than the condition or resistance of the weld tip.

Once calculated, the averages ($C_a$) are recorded in the database 28 of the maintenance system 10. The database 28 is preferably a memory system in operative communication with the weld data analysis system 26 for storing data therefrom. Preferably, the database can store the C-factor averages ($C_a$) over extended periods of time (e.g., weeks, months, years, decades etc . . . ).

Upper and lower limits are established for the C-factor averages ($C_a$) so that the averages ($C_a$) may be compared to the upper and lower limits to indicate an upcoming failure of a weld gun 12 as part of indicating when maintenance needs to be performed on the weld gun 12. The upper and lower limits for the guns 12 are preferably established separately for each gun 12 since each gun 12 typically has a different C-factor or C-factor average ($C_a$) at which maintenance of the gun 12 is preferably performed before failure of the gun 12. Determination of the upper and lower limits can take into account history of the gun 12 (e.g., below or above what limits the gun 12 or similar guns 12 have failed or been close to failing previously), general engineering reasoning (e.g., determining what the C-factor averages ($C_a$) are indicating about the resistance being experienced in a particular gun 12) and other factors as well. Alternatively or in addition, trial and error techniques may be employed wherein the limits are set and then changed if such limit is shown to be too high or too low. Preferably, the upper limit is established as the value of the first one or more C-factors of a gun 12 when the gun 12 is new or in its least worn condition.

If one or more of the C-factor averages ($C_a$) for one of the weld guns 12 is about equal to or greater than the upper limit or about equal to or lower than the lower limit, maintenance is performed upon the weld gun 12. If possible, the maintenance is performed while automotive vehicle production is still in progress. Alternatively, maintenance is performed during planned downtimes of an automotive assembly line or automotive manufacturing plant or may be performed at other convenient times as well.

Figure 2:
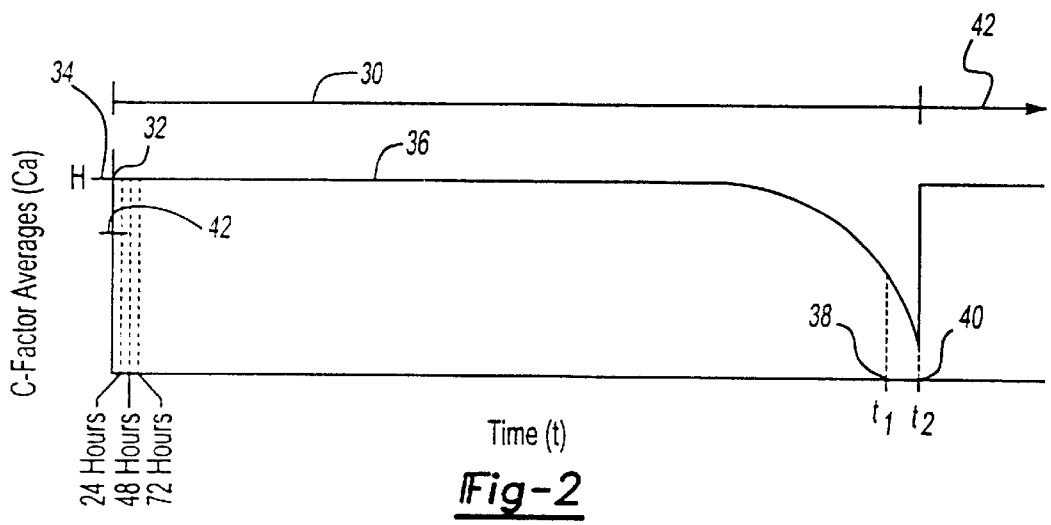
FIG. 2 illustrates a model graph of data for a spot welding gun.

Referring to FIG. 2, there is an exemplary graph illustrating the C-factor averages ($C_a$) of the C-factors for a weld gun 12 as the averages ($C_a$) decline during a depreciation cycle 30. At the beginning 32 of the cycle 30, the C-factor averages ($C_a$) are at or near a C-factor value (H) 34. The C-factor value (H) 34 represents an expected or desired value for the C-factor of a welding gun 12 that is new, relatively new and/or has recently had maintenance performed upon it.

For each C-factor average ($C_a$), a time (t) is recorded wherein (t) represents at least approximately the amount of time elapsed between the beginning 32 of the cycle 30 and the recording of the C-factors that resulted in the C-factor average ($C_a$). For example, as shown in FIG. 2, a C-factor average ($C_a$) may be calculated at every twenty four hour interval after the beginning 32 of the depreciation cycle 30 and, if desired, a curve 36 connecting points representative of the averages ($C_a$) may be generated.

Over time, the welding guns 12 or components thereof wear and depreciate, thus raising the resistance of the gun 12 to carrying current. Consequently, the C-factor averages ($C_a$) become progressively smaller. As shown by the graph in FIG. 2, the averages ($C_a$) tend to become smaller at an accelerated rate over time. The rate is strongly indicative of upcoming failures that are likely to occur if maintenance is not performed upon the gun 12 since the rate becomes increasingly negative the closer in time the gun 12 is to failure.

Accordingly, the rate at which the C-factor averages ($C_a$) are becoming smaller is monitored by the data analysis system 26 to determine when maintenance is to be performed on a weld gun 12. The rate of decline of the C-factor averages ($C_a$) referred to herein as the rate of depreciation ($R_d$) of the C-factor averages ($C_a$) or the rate of depreciation ($R_d$) of the gun 12 is calculated as the derivative of the C-factor averages ($C_a$) with respect to time according to the relationship:

Rate $(R_d) = d\,(C_a)/d(t)$ wherein the values of the rate of depreciation ($R_d$) are negative and becoming more negative since the C-factor averages ($C_a$) are decreasing over time at an increased rate as time elapses during a depreciation cycle.

Therefore, a threshold value is established for comparison with the rates of depreciation ($R_d$) to indicate upcoming failure of a weld gun 12. Once at least one rate of depreciation ($R_d$) is calculated to be about equal to or less than the threshold value, maintenance is performed upon the welding gun 12. The threshold value is determined in a similar manner to the determination of the upper and lower limits of the C-factor averages ($C_a$). The threshold value can take into account history of the gun 12 (e.g., at what rate of depreciation ($R_d$) has the gun 12 or similar guns 12 failed or been close to failing previously), general engineering reasoning (e.g., determining what rates of depreciation indicate a resistance in the gun 12 that will likely cause a failure) and other factors as well. Alternatively or in addition, trial and error techniques may be employed wherein the threshold value is established and then changed if the value is shown to be too high or too low.

The maintenance is preferably performed while automotive vehicle production is still in progress. Alternatively, maintenance is performed during planned downtimes of an assembly line or manufacturing plant or may be performed at other convenient times as well. Advantageously, the threshold value more accurately predicts when maintenance for a welding gun 12 is critical, thereby preventing the performance of unneeded or undesired maintenance.

In the graph of FIG. 2, the threshold value is illustratively met at time ($t_1$) 38 indicating a desired time for maintenance of the welding gun 12, which, in the example, is performed at a time ($t_2$) 40. After maintenance is performed, the C-factors preferably rise back to the C-factor value (H) 32 and a new depreciation cycle 42 begins.

In some instances, however, the maintenance performed on the welding gun 12 causes the C-factor to increase, but the C-factor may not return to the C-factor value (H) 32. Such a reduced increase can indicate that the maintenance performed was at least partially ineffective (i.e., the maintenance performed merely masked a true cause of the declining C-factors rather than repairing that cause). Therefore, a C-factor lower limit 42 is set at a predetermined value below the C-factor value (H) 34. If the C-factors do not meet or exceed the lower limit 42 after maintenance is performed, further maintenance is performed to restore the C-factor at or above the lower limit 42 to start a new depreciation cycle. The lower limit 42 may be established in a manner similar to establishment of the upper and lower limits for the C-factors averages ($C_a$) or the threshold ($R_d$) (e.g., with resort to historical information, engineering reasoning, trial and error or otherwise).

Advantageously, monitoring of weld gun depreciation rates ($R_d$) can detect rapid rates of depreciation that indicate a need for maintenance where the depreciation rates ($R_d$) have become rapid at higher C-factor levels above the lower limits set for the C-factor averages ($C_a$). The lower limits for the C-factor averages ($C_a$) of C-factors of the weld gun 12 can detect upcoming failures of the weld gun 12 for gradual rates of depreciation ($R_d$) of weld gun circuitry as the values of ($C_a$) gradually go below the lower limit of ($C_a$) without nearing the threshold value established for ($R_d$). Lastly, maintenance needs for normal depreciation rates ($R_d$) may be detected by either the lower C-factor average ($C_a$) limit or the depreciation rate ($R_d$) threshold.

From the foregoing, it should be appreciated that a system and method are provided for performing preventative maintenance upon welding guns. While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient road map for implementing a preferred embodiment of the invention and various changes can be made in the function and arrangements of the exemplary embodiment without departing from the spirit and scope of the appended claims.

What is claimed is:

1. A method of performing preventative maintenance on a spot welding gun, comprising:

collecting a plurality of C-factors during a depreciation cycle of said spot welding gun;

computing a plurality of C-factor averages ($C_a$) of said plurality of C-factors, at least one of said plurality of C-factor averages ($C_a$) computed for each of a plurality of predetermined time intervals within said depreciation cycle;

establishing a lower limit for said plurality of C-factor averages ($C_a$);

computing a plurality of rates of depreciation ($R_d$) of said plurality of C-factor averages ($C_a$);

establishing a threshold value for said plurality of rates of depreciation ($R_d$);

performing preventative maintenance on said spot welding gun if a comparison between at least one of said plurality of rates of depreciation ($R_d$) and said threshold value for said rates of depreciation ($R_d$) indicates an upcoming failure of said welding gun; and performing preventative maintenance on said spot welding gun if a comparison between at least one of said plurality of C-factor averages ($C_a$) and said lower limit for said plurality of C-factor averages ($C_a$) indicates said upcoming failure of said welding gun.

2. A method as in claim 1, further comprising:

establishing a value (H) defined as a desired C-factor for said spot welding gun shortly after performing maintenance on said spot welding gun;

collecting at least one post-maintenance C-factor for said spot welding gun after performing maintenance on said spot welding gun; and performing additional maintenance on said spot welding gun if said at least one post-maintenance C-factor is a predetermined value less than said value (H) to indicate that prior maintenance was at least partially ineffective.

3. A method as in claim 1, further comprising:

establishing an upper limit for said plurality of C-factor averages ($C_a$); and performing maintenance on said spot welding gun if a comparison between at least one of said plurality of C-factor averages ($C_a$) and said upper limit indicates said upcoming failure of said spot welding gun.

4. A method as in claim 3, wherein said comparison of said at least one of said plurality of C-factor averages ($C_a$) with said upper limit indicates said upcoming failure of said spot welding gun when said at least one of said plurality of C-factor averages ($C_a$) is about equal to or greater than said upper limit.

5. A method as in claim 1, wherein each of said plurality of predetermined time intervals is greater than about twelve hours.

6. A method as in claim 5, wherein each of said plurality of predetermined time intervals is approximately twenty-four hours.

7. A method as in claim 1, wherein said spot welding gun includes a replaceable weld tip that is replaced according to stepping cycles and said plurality of C-factors are collected during secondary predetermined time intervals within said stepping cycles for computing said plurality of C-factor averages ($C_a$).

8. A method as in claim 1, wherein said plurality of rates of depreciation ($R_d$) are calculated according to the equation ($R_d$)=d($C_a$)/d(t), wherein (t) is time.

9. A method as in claim 1, wherein said comparison of said at least one of said plurality of rates of depreciation ($R_d$) with said threshold value indicates said upcoming failure of said spot welding gun when said at least one of said plurality of rates of depreciation ($R_d$) is about equal to or less than said threshold value.

10. A method as in claim 1, wherein said comparison of said at least one of said plurality of C-factor averages ($C_a$) with said lower limit indicates said upcoming failure of said spot welding gun when said at least one of said plurality of C-factor averages ($C_a$) is about equal to or less than said lower limit.

11. A system for performing preventative maintenance on a spot welding gun, comprising:
a weld controller configured to calculate a plurality of C-factors during a depreciation cycle of said spot welding gun;
a data collection system configured to collect said plurality of C-factors calculated by said weld controller during said depreciation cycle of said spot welding gun; and
a data analysis system configured to access said data collection system and compute a plurality of C-factor averages ($C_a$) of said plurality of C-factors with at least one of said plurality of C-factor averages ($C_a$) computed for each of a plurality of predetermined time intervals within said depreciation cycle such that preventative maintenance can be performed if a comparison between at least one of said plurality of C-factor averages ($C_a$) and a lower limit for said plurality C-factor averages ($C_a$) indicates an upcoming failure of said welding gun, said data analysis system further configured to compute a plurality of rates of depreciation ($R_d$) of said plurality of C-factor averages ($C_a$) such that preventative maintenance can also be performed if a comparison between at least one of said plurality of rates of depreciation ($R_d$) and a threshold value for said plurality of rates of depreciation ($R_d$) indicates said upcoming failure of said welding gun.

12. A system as in claim 11, wherein said data analysis system is configured to access said data collection system for a least one post-maintenance C-factor after maintenance has been performed on said spot welding gun such that additional maintenance can be performed on said spot welding gun if said at least one post-maintenance C-factor is a predetermined value less than a value (H) to indicate that prior maintenance was at least partially ineffective, said value (H) defined as a desired C-factor for said spot welding gun shortly after performing maintenance on said spot welding gun.

13. A system as in claim 11, wherein each of said plurality of predetermined time intervals is greater than about twelve hours.

14. A system as in claim 11, wherein each of said plurality of predetermined time intervals is approximately twenty-four hours.

15. A system as in claim 11, wherein said data analysis system is configured to compute said plurality of rates of depreciation ($R_d$) of said plurality of C-factor averages ($C_a$) according to the equation:

$$(R_d)=d(C_a)/d(t)$$

wherein (t) is time.

16. A method of performing preventative maintenance on a spot welding gun, comprising:
collecting a plurality of C-factors during a depreciation cycle of said spot welding gun;
computing a plurality of C-factor averages ($C_a$) of said plurality of C-factors, at least one of said plurality of C-factor averages ($C_a$) computed for each of a plurality of predetermined time intervals within said depreciation cycle;
establishing a lower limit and an upper limit for said plurality of C-factor averages ($C_a$);
computing a plurality of rates of depreciation ($R_d$) of said plurality of C-factor averages ($C_a$);
establishing a threshold value for said plurality of rates of depreciation ($R_d$);
performing preventative maintenance on said spot welding gun if a comparison between at least one of said plurality of rates of depreciation ($R_d$) and said threshold value for said rates of depreciation ($R_d$) indicates an upcoming failure of said welding gun;
performing preventative maintenance on said spot welding gun if a comparison between at least one of said plurality of C-factor averages ($C_a$) and said lower limit for said plurality of C-factor averages ($C_a$) indicates said upcoming failure of said welding gun;
performing maintenance on said spot welding gun if a comparison between at least one of said plurality of C-factor averages ($C_a$) and said upper limit indicates said upcoming failure of said spot welding gun;
establishing a value (H) defined as a desired C-factor for said spot welding gun shortly after performing maintenance on said spot welding gun;
collecting at least one post-maintenance C-factor for said spot welding gun after performing maintenance on said spot welding gun; and
performing additional maintenance on said spot welding gun if said at least one post-maintenance C-factor is a predetermined value less than said value (H) to indicate that prior maintenance was at least partially ineffective.

* * * * *